(No Model.)
E. W. ROSS.
GEARING.
No. 275,861.
Patented Apr. 17, 1883.
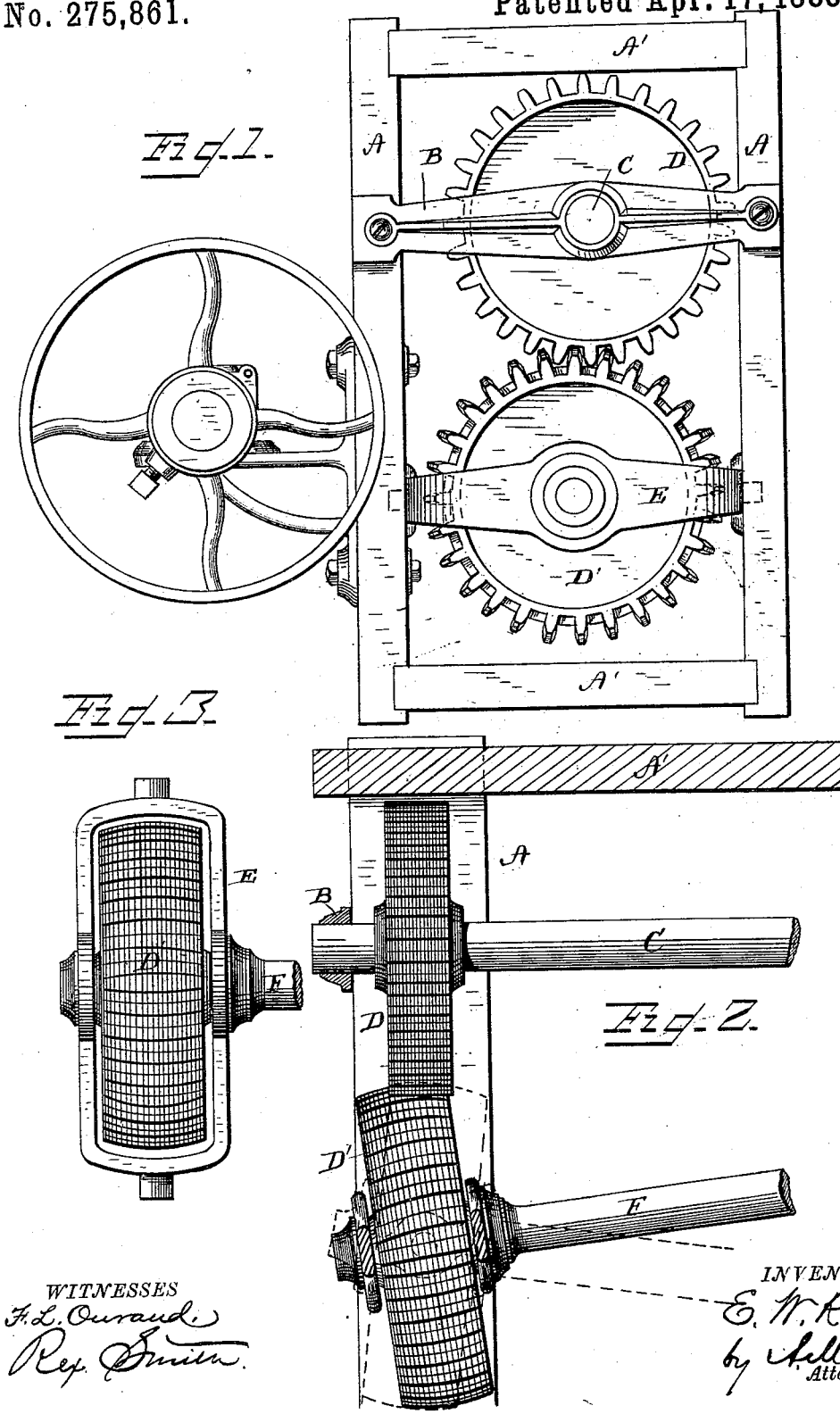
WITNESSES
INVENTOR

UNITED STATES PATENT OFFICE.

ELMORE W. ROSS, OF FULTON, NEW YORK.

GEARING.

SPECIFICATION forming part of Letters Patent No. 275,861, dated April 17, 1883.

Application filed March 1, 1883. (No model.)

*To all whom it may concern:*

Be it known that I, ELMORE W. ROSS, of Fulton, county of Oswego, and State of New York, have invented a new and useful Improvement in Gearing, of which the following is a full, clear, and exact description, reference being had to the accompanying drawings, making part of this specification.

My invention relates to a construction of gearing and to the manner of supporting the same, whereby one of two shafts arranged side by side in parallel relation or thereabout and actuated one from the other is adapted to be adjusted or vibrated from a parallel to an angular relation to the other without interfering or disturbing the working relation of the gears connecting said shafts; and it consists in making one of the gears round-faced or convex from side to side, and giving a corresponding convex curvature from side to side of the wheel of the pitch-lines and outer faces of the teeth or cogs, and in mounting said gear or the one meshing therewith in a pivotal yoke, adapting it to be vibrated laterally for varying the angle of relation of the shafts connected by said gears, as hereinafter explained.

In the accompanying drawings, Figure 1 represents a side elevation of the two gears and the pivotal yoke in which one of said gears is mounted in conformity with my invention. Fig. 2 is an edge elevation of the gears, showing the shafts connected by them in side elevation, and Fig. 3 is a plan view of the round-faced gear and the pivotal yoke in which it is mounted.

A A' represent a frame-work of any suitable form, according to the character of the machine to which my improved gearing is to be applied. Where the parallel shafts are horizontal and one above the other the frame-timbers A A will be uprights, and these are connected by transverse bars or stringers B, in which a shaft, C, has its bearings, said shaft being provided with a spur-gear, D, which engages with and drives or is driven by a round-faced gear, D', mounted in bearings in a swiveling yoke, E, pivoted in suitable bearings in the frame-timbers A A. The face or periphery of this gear-wheel is, by preference, made in the form of a section of a sphere, rounding outward between its flattened sides in the arc of a circle of which the axial center of the wheel is the center in such manner that the outer face of the wheel is rounded in both directions from the said center, and the teeth $d$ of said wheel round outward or are curved on their outer faces and pitch-lines from side to side of the wheel from the same center. This, as stated, is the preferred form, as it adapts said wheel to be vibrated laterally to any desired extent without danger of causing its teeth to "bottom" between the teeth of the wheel D, and serves to hold them always in uniform depth of mesh therewith; but, of course, the arc of curvature of the teeth may be varied from that described with more or less beneficial effect; or, instead of being in curved lines, they may be thrown outward in short angular lines. The face of wheel D is shown made straight or in right lines from side to side; but, if desired, it may be made with a concave face, its teeth curving inward from side to side conforming to the outward transverse curvature of the gear D', this form giving greater width of mesh to the teeth of the two gears without interfering with the free lateral vibration of the round-faced gear.

The yoke E may be made in any suitable form, either in a single piece, in which case the shaft F of the gear D' would form the support for said gear in the yoke, and the gear would need to be held to the shaft by a key or set-screw, or by the form of the hole in the gear and of the shaft passing through it, whether feathered, polygonal, or otherwise, adapting it to rotate with or be rotated by its shaft; but the yoke may be made in two parts or provided with removable half-boxes, adapting it to receive the hubs or sleeves of the wheel D', and in the latter case the wheel may be keyed or otherwise secured to the shaft in any preferred manner.

Under some circumstances it may be found desirable to mount the straight-faced gear D, instead of the round-faced gear D', in the swiveling yoke, or to make both gears convex-faced; but the construction and arrangement described will ordinarily be found to provide for all necessary adjustment of the angle of relation of the two shafts.

The invention described will be found to be of especial value in machines where a yielding movement of some of the actuated devices is required—as, for example, in machines employing feed rollers or aprons where the material operated upon by said rollers or aprons varies in bulk or thickness, and it becomes essential that one of the feeding devices should yield to accommodate such varying thickness and so prevent breakage. By the employment of the round-faced vibrating gear for actuating the shaft of such yielding or adjustable part, the cramping or the otherwise imperfect and varying mesh of the actuating-gears heretofore employed is avoided.

Motion may be communicated to the gear D and its shaft, and thence to gear D' and its shaft, or vice versa, from any suitable motor, and in any usual or preferred manner, according to the machine to which they are applied.

Having now described my invention, what I claim as new is—

1. Two intermeshing gears, one of which is convex on its outer face, having its teeth rounded outward on their outer faces and pitch-lines from side to side of the gear, and one of which gears also is adapted to vibrate laterally, substantially as described.

2. A spur-gear having its outer face and the outer face and pitch-lines of its teeth rounded outwardly or made convex from side to side of the wheel, in combination with a swiveling yoke in which said gear is supported for adapting it to be vibrated laterally, substantially as described.

3. The combination of the gear D, the convex-faced gear D' meshing therewith, the swiveling yoke E, in which one of said gears is mounted, and the shafts C and F, arranged and operating substantially as and for the purpose described.

In testimony whereof I have hereunto set my hand this 16th day of February, A. D. 1883.

E. W. ROSS.

Witnesses:
REX. SMITH,
EDW. W. DEKNIGHT.